(12) United States Patent
Aquelet (10) Patent No.: US 8,744,825 B2
(45) Date of Patent: Jun. 3, 2014

(54) ELEMENT REFINEMENT METHODS AND SYSTEMS IN ARBITRARY LAGRANGIAN-EULERIAN (ALE) BASED FINITE ELEMENT ANALYSIS

(75) Inventor: Nicolas Aquelet, Livermore, CA (US)

(73) Assignee: Livermore Software Technology Corp., Livermore, CA (US)

(*) Notice: Subject to any disclaimer, the term of this patent is extended or adjusted under 35 U.S.C. 154(b) by 367 days.

(21) Appl. No.: 13/371,804

(22) Filed: Feb. 13, 2012

(65) Prior Publication Data

US 2013/0211796 A1     Aug. 15, 2013

(51) Int. Cl.
*G06G 7/50* (2006.01)
*G06F 7/60* (2006.01)
*G06F 17/10* (2006.01)
*G06G 7/48* (2006.01)

(52) U.S. Cl.
CPC .. *G06G 7/50* (2013.01); *G06F 7/60* (2013.01); *G06F 17/10* (2013.01); *G06G 7/48* (2013.01)
USPC ...................................... 703/9; 703/2; 703/6

(58) Field of Classification Search
CPC .......... A61B 5/103; B64C 33/02; F01D 5/14; G01M 17/00; G01N 27/00; G01N 11/02; G06F 7/60; G06F 17/10; G06F 17/11; G06F 17/50; G06F 15/00; G06F 19/00; G06F 7/48; G06G 7/48; G06G 7/50; G06K 9/36; G07K 1/26
USPC ...................................................... 703/2, 6, 9
See application file for complete search history.

(56) References Cited

U.S. PATENT DOCUMENTS

2010/0256957 A1* 10/2010 Slavik .............................. 703/2
2011/0288834 A1* 11/2011 Yamazaki et al. ................ 703/2

OTHER PUBLICATIONS

Morrell et al., "A cell by cell anisotropic adaptive mesh ALE scheme for the numerical solution of the Euler equations", Journal of Computational Physics 226 (2007).*
Kim et al., "Adaptive refinement techniques based on tetrahedral and hexahedral grids for finite element analysis of mold filling in casting processes", Computer Methods Applied Mechanics and Engineering 195 (2006).*
Fressmann et al., "Advection approaches for single- and multi-material arbitrary Lagrangian—Eulerian finite element procedures", Computational Mechanics (2007).*
Gaston et al., "An Arbitrary Lagrangian Eulerian finite element approach to non steady state turbulent fluid flow with application to mould filling in casting", International Journal of Numerical Methods in Fluids 34 (2000).*

(Continued)

*Primary Examiner* — Kandasamy Thangavelu
(74) *Attorney, Agent, or Firm* — Roger H. Chu (57) ABSTRACT

Systems and methods for refining ALE elements in a time-marching simulation are disclosed. A FEA model representing a physical domain is defined and used in a time-marching simulation that simulates physical phenomena of the physical domain. Certain ones of the ALE elements are refined upon detecting a user-defined triggering condition. Each of said certain ones of the ALE elements is refined into a number of child elements. When an ALE element contains more than one material, volume fractions representing respective materials are calculated in each of the child elements right after each refinement. At each advection phase, each donor maps its flux to one or more receptors. When a donor maps its flux to multiple receptors, each receptor calculates its own share of the flux from the donor. When the donor contains more than one material, each receptor must account for such situation.

20 Claims, 11 Drawing Sheets

(56) References Cited

OTHER PUBLICATIONS

Bellet et al., "ALE method for solidification modelling", Computer Methods Applied Mechanics and Engineering 193 (2004).*

Summers et al. "Recent Progress in ALEGRA development and application to Ballistic impacts", International Journal of Impact Engineering, 1997.*

* cited by examiner

ELEMENT REFINEMENT METHODS AND SYSTEMS IN ARBITRARY LAGRANGIAN-EULERIAN (ALE) BASED FINITE ELEMENT ANALYSIS

FIELD

The present invention generally relates to element refinement techniques in computer-aided engineering analysis, more particularly to element refinement methods and related systems in Arbitrary Lagrangian-Eulerian (ALE) based finite element analysis.

BACKGROUND

Arbitrary Lagrangian-Eulerian (ALE) based finite element formulation uses a computational system that is not fixed in space (e.g. Eulerian-based finite element formulations) or attached to material (e.g. Lagrangian-based finite element formulations). ALE based finite element simulations can alleviate many of the drawbacks that the traditional Lagrangian-based and Eulerian-based finite element simulations have. ALE techniques can be applied to many engineering problems, for example, fluid-structure interaction, coupling of multi-physics fields with multi-materials (moving boundaries and interfaces), metal forming/cutting, casting, and the likes.

When using the ALE technique in engineering simulations, the computational mesh inside the domains can move arbitrarily to optimize the shapes of elements, while the mesh on the boundaries and interfaces of the domains can move along with materials to precisely track the boundaries and interfaces of a multi-material system.

In a time marching simulation using ALE based finite element analysis (FEA), simulated responses are obtained in two solution phases or cycles (Lagrangian and advection) at each time step. First, in Lagrangian phase, responses of the FEA mesh model in form of material flux are computed. Nodes of the FEA mesh are moved accordingly. Next, in the advection phase, the computed material flux are mapped back to original undeformed mesh by letting computed material flux (i.e., deformed portion measured in volume) move out of a donor into one or more receptors.

In order to obtain better simulated responses, the FEA mesh needs to be refined at locations of interest. One of the problems associated with refining ALE elements is related to mapping of the computed results, which has been problematic in prior art approaches. It would therefore be desirable to have improved methods and systems for refining ALE elements in a time-marching simulation using ALE based FEA.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods for refining ALE elements of a FEA model in a time-marching simulation using ALE based FEA are disclosed. According to one exemplary embodiment of the present invention, a FEA model representing a physical domain (e.g., fluid such as air or water surrounding an object, solid with multiple materials within) with a plurality of ALE elements is defined and used in a time-marching simulation that simulates physical phenomena of the physical domain. The simulated responses are used for helping user to make design decision of a product as to whether a particular design of the product is suitable. For example, shock waves from an explosive source traveling through air, fluid-structure interaction between air and airplane, fluid-structure interactions between waves and a ship.

A group of the ALE elements are refined upon detecting a triggering condition defined by user. In a refinement procedure, each hexahedral or eight-node solid parent ALE element is divided into eight hexahedral child elements. Refinement can be performed in multiple levels. Each ALE element contains at least one material. When an ALE element contains more than one material, volume fractions representing respective materials are calculated in each of the child elements right after a refinement operation. The triggering condition includes, but is not limited to, static refinement, dynamic refinement and alike. Dynamic refinement can be performed periodically and/or based on other conditions such as detecting of pressure changes over a threshold, emerging of a solid border.

In the time-marching simulation, at each advection phase, each donor maps computed material flux to one or more receptors. When a donor maps computed material flux to multiple receptors, each receptor calculates its own portion of the material flux from the donor. When the donor contains more than one material, each receptor must account for such situation.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

Figure 1A:
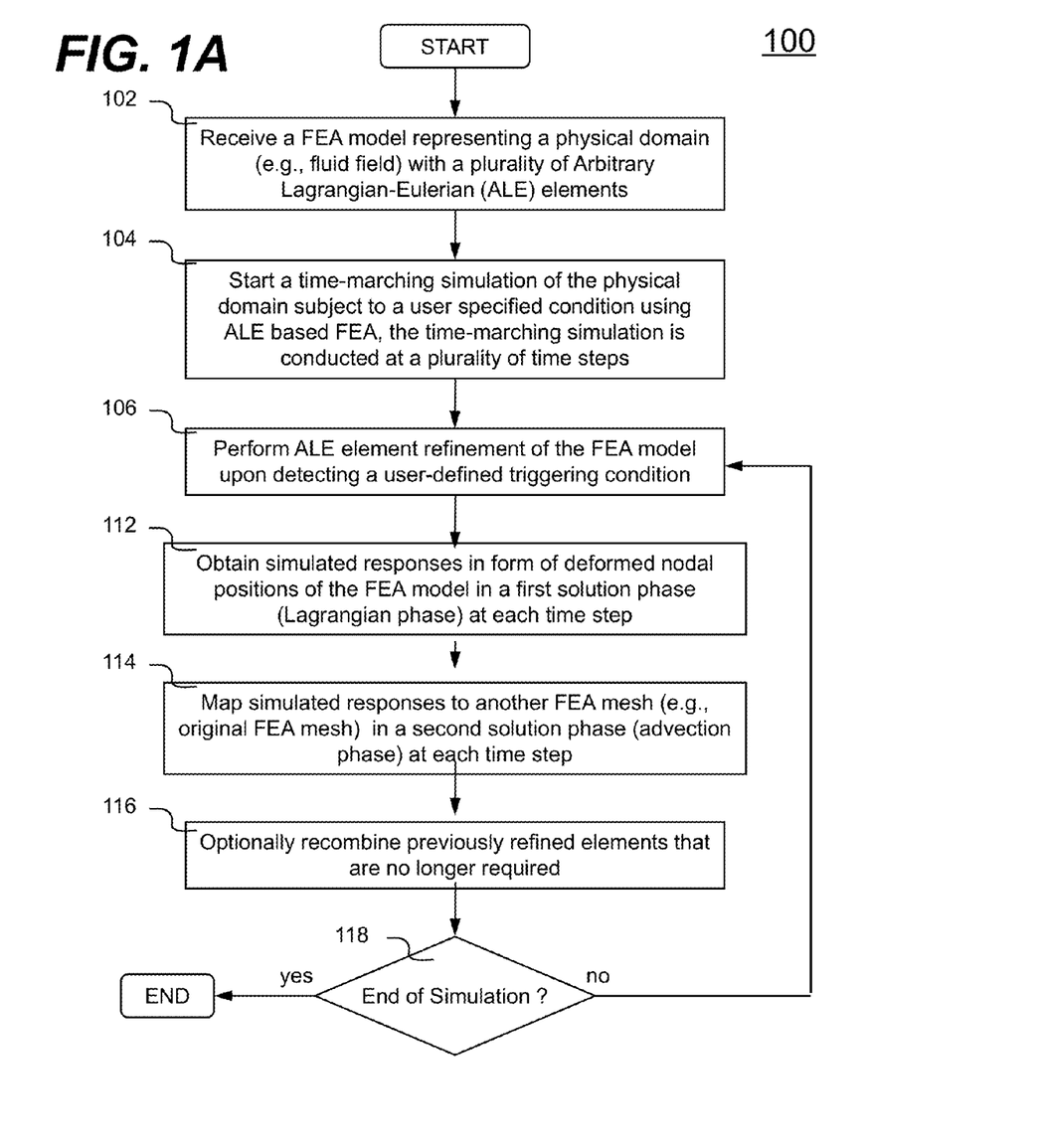
FIG. 1A is a flowchart illustrating an exemplary process of refining Arbitrary Lagrangian-Eulerian (ALE) elements of a finite element analysis (FEA) model used in a time-marching simulation for simulating phenomena of a physical domain, according to an embodiment of the present invention.

FIG. 1A is a flowchart illustrating an exemplary process 100 of refining Arbitrary Lagrangian-Eulerian (ALE) elements of a finite element analysis (FEA) model used in a time-marching simulation that simulates physical phenomena of a physical domain (e.g., fluid field), according to an embodiment of the present invention. Process 100 is implemented in software and preferably understood in conjunction with other figures in this paper.

Process 100 starts by receiving a finite element analysis (FEA) model representing a physical domain (e.g., air, ocean, etc.) with a plurality of ALE elements at step 102. Next, at step 104, a time-marching simulation is conducted for obtaining simulated physical phenomena (e.g., aerodynamics, hydrodynamics) of the physical domain subject to a user specified condition using ALE based FEA. The user specified condition includes, but is not limited to, an initial condition, a boundary condition, a loading condition, etc. The time-marching simulation is conducted at a plurality of time steps (sometimes referred to as solution cycles). Generally, in a time-marching simulation, an initial simulated response is obtained at time zero (t=0). Later simulated responses are then obtained at a number of subsequent time steps (t=t+$\Delta$t) by incrementing the time with a time step size ($\Delta$t).

At step 106, an ALE element refinement procedure is performed upon detecting a user defined triggering condition. For example, the refinement can be performed only once initially in the beginning of the time-marching simulation. This is referred to as static refinement. The refinement can also be performed multiple times periodically, for example, every ten (or other numbers) time steps. Further, the refinement can be performed multiple times when certain criteria have been met, for example, a pressure change is greater than a threshold value in certain elements (e.g., shock wave), or a structure border emerges in certain elements (see FIG. 2D). Shown in the left side of FIG. 2D, a structure border 240 intersects ALE elements 241-243. A dynamic refinement is performed (shown as an arrow), each of the ALE elements 241-243 is divided into eight child elements shown in the right side of FIG. 2D. In contrast to static refinement, these are dynamic refinements.

Figure 1B:
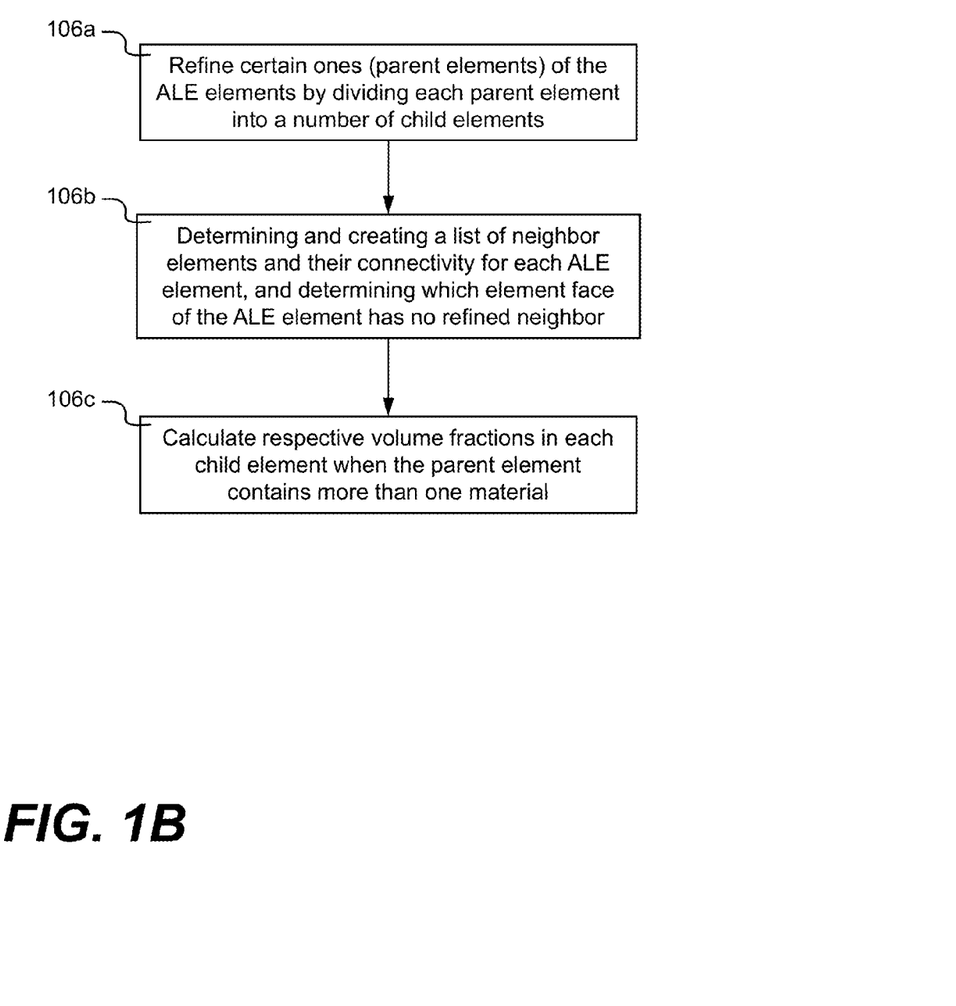
FIG. 1B is a flowchart showing more detailed operations of refining ALE elements of the exemplary process of FIG. 1A.
Figure 2A:
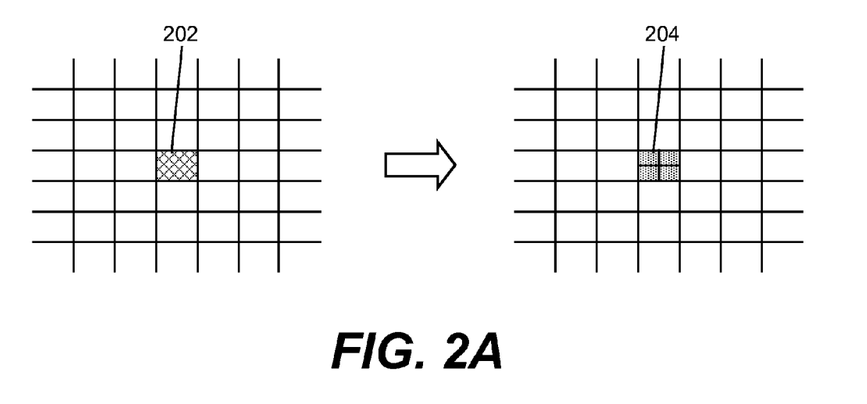
FIGS. 2A-2D are two-dimensional diagrams graphically showing various exemplary hexahedral ALE element refinement schemes in accordance with one embodiment of the present invention.
Figure 2B:
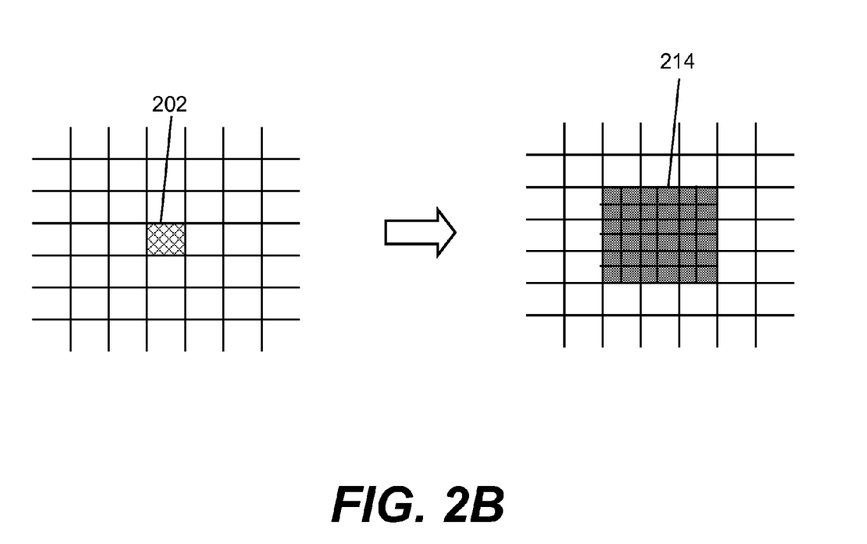
Figure 2C:
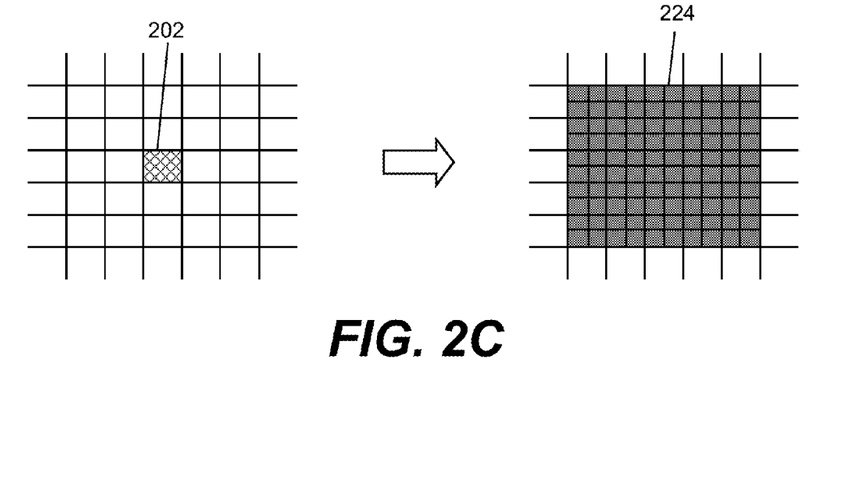
Figure 2D:
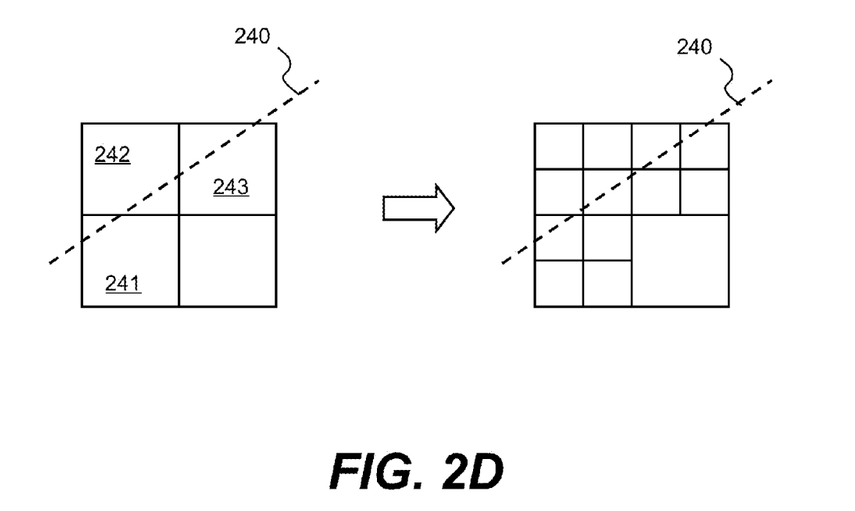

FIG. 1B shows detailed steps 106a-106c of performing ALE element refinement. At step 106a, a group of hexahedral ALE elements (certain ALE elements are referred to as parent elements) are refined by dividing each parent element 302 into eight child elements 304 shown in FIG. 3A. FIG. 2A shows a two-dimensional view of an example of refining ALE elements. A parent ALE element 202 is refined into eight child elements 204 (only four shown due to two-dimensional view). The group of parent ALE elements is specified by user with well-known manners. For example, a part number or identifier can be used for specifying which one or ones of the ALE elements to be refined. It is noted that each child element 204 can be further refined into eight more elements (not shown) if desired. Other options to create child elements include, but are not necessary limited to, one additional layer of child elements 214 around the specified parent element 202 shown in FIG. 2B, or two layers of child elements 224 shown in FIG. 2C.

Figure 4:
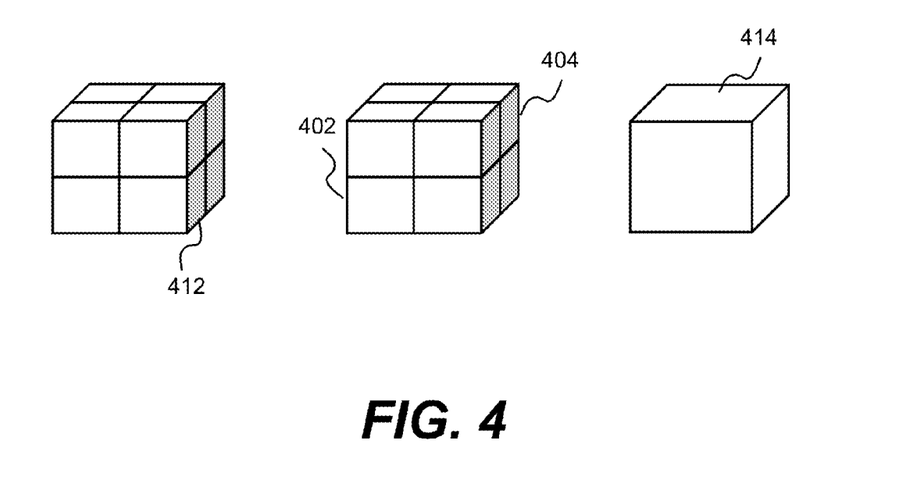
FIG. 4 is a diagram showing an exemplary relationship between a refined element and an element without refinement in accordance with one embodiment of the present invention.

Next, at step 106b, for each element, a list of neighbor elements and their connectivity is determined and created for mapping operation in advection phase, for example, respective portions of at least one material flux is calculated using this inform. Also determined at step 106b is which element face of each element has neighbor element without refinement for balance of forces and interpolation of velocities in advection phase. FIG. 4 shows a child element 402 having neighbor element 412 with refinement and another child element 404 having neighbor element 414 without refinement. For illustration clarity and simplicity, only three elements are depicted and the neighbor elements are shown separated from each other.

Figure 3A:
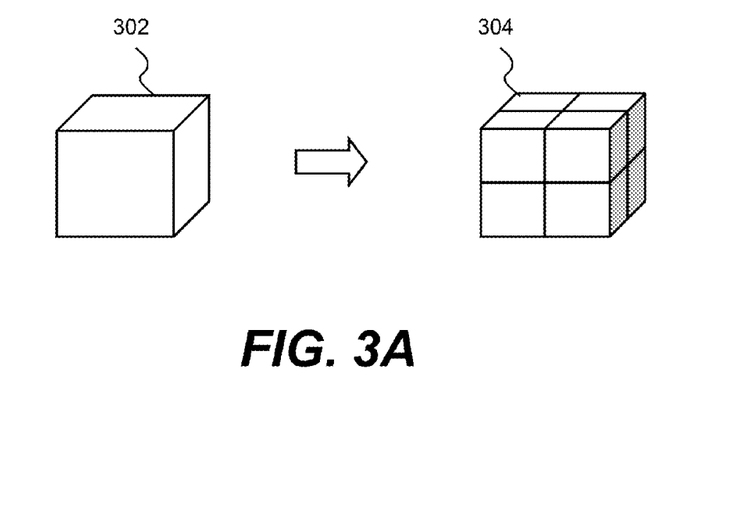
FIG. 3A is a diagram showing an exemplary hexahedral ALE element being refined into eight child element in accordance with one embodiment of the present invention.
Figure 3B:
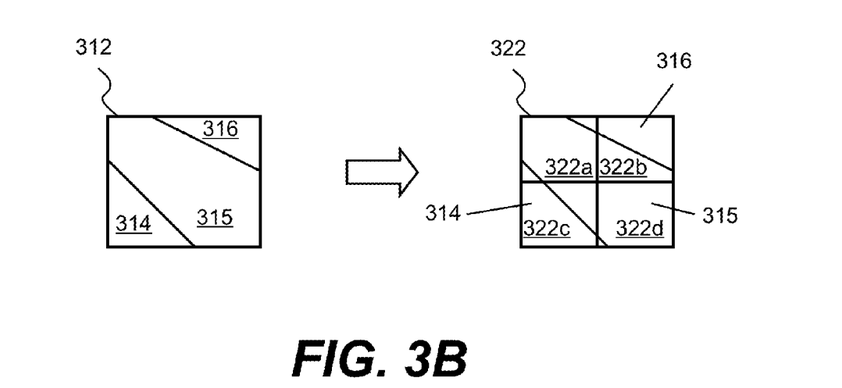
FIG. 3B is a two-dimensional diagram showing exemplary parent and child elements containing more than one material according to an embodiment of the present invention.

At step 106c, for a parent ALE element containing more than one material, respective volume fractions of the materials are calculated in each of the child elements. An example is shown in FIG. 3B, a parent ALE element 312 contains three materials 314-316. After a refinement operation, the parent ALE element 312 becomes eight child elements 322. For each of the child elements (for illustration simplicity, only four shown 322a-322d in a two-dimensional diagram), volume fractions with respect to these three materials 314-316. For example, element 322a contains three materials thereby requiring calculations of three volume fractions, while elements 322b-322d contains only two materials. It is noted that volume fractions are used for calculating material volumes, masses, nodal masses, internal energies, etc.

Referring back to step 112, in a first solution phase (Lagrangian phase) at each time step of the time-marching simulation, nodal forces are calculated for the FEA model using FEA. The FEA model then deforms accordingly. As a result, simulated responses in form of deformed nodal positions are obtained. Next, at step 114, in a second solution phase (advection phase) at each time step, the simulated response obtained in the first solution phase is mapped to another FEA mesh (generally the original or initial FEA mesh). It is noted that another FEA mesh can also be an arbitrarily new mesh defined by user.

Figure 1C:
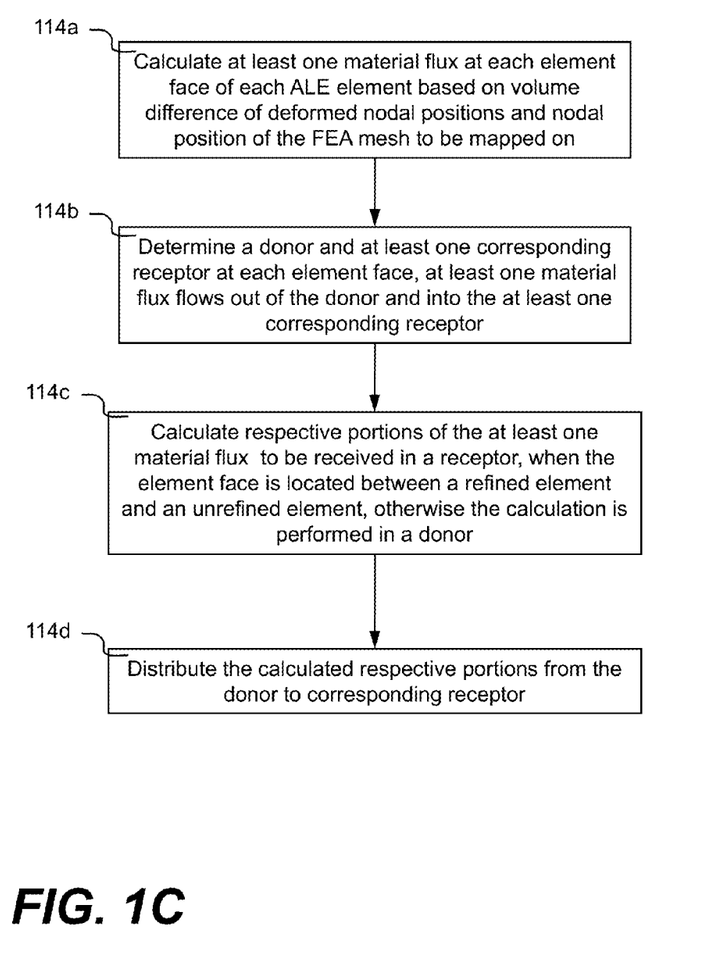
FIG. 1C is a flowchart showing more detailed operations of advection phase at each time step of the exemplary process of FIG. 1A.

In the mapping operation, process 100 first calculates at least one material flux at each element face of each ALE element using the volume difference between deformed nodal positions and the nodal positions of the FEA mesh to be mapped on at step 114a shown in FIG. 1C. Then, at step 114b, a donor and at least one corresponding receptor are determined by direction of the material flux. The donor is the element giving out the material flux at the particular element face, while the receptor receives the material flux. Or material flux flows out of a donor into one or more receptors. Under certain circumstances, a donor can be a receptor of another donor. In other words, a first ALE element gives material flux to a second ALE element while receives another material flux from a third ALE element. To determine donor and receptor, the list of neighbor elements for each ALE element (e.g., the list created in step 106b, which lists the unrefined neighbors of refined elements) must be known.

Next, at step 114c, respective portions of the at least one material flux to be distributed are calculated in at least one receptor, when the element face is located between an unrefined element and a refined element. Otherwise, the calculation is performed in the donor. Finally, at step 114d, the calculated respective portions of the at least one material flux are distributed accordingly.

Figure 5A:
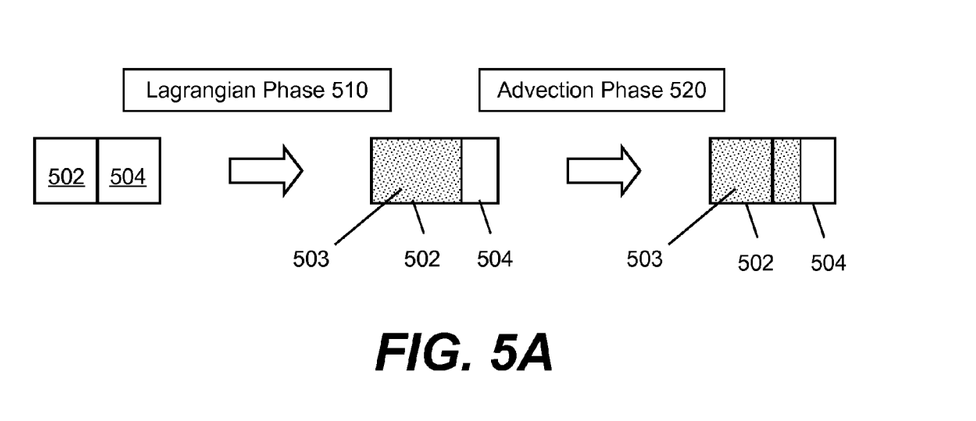
FIGS. 5A-5C are schematic diagrams showing exemplary advection phase mapping of material flux computed in Lagrangian phase according to one embodiment of the present invention.

FIG. 5A shows a first example of solution mapping of ALE based FEA. Two originally undeformed ALE elements 502, 504 are shown in the left side. The elements are then deformed after Lagrangian phase 510 shown in the middle. Material flux 503 is illustrated as shaded area with element 502 as a donor and element 504 as a receptor. In advection phase 520, the material flux is mapped to original FEA mesh shown in the right side.

Figure 5B:
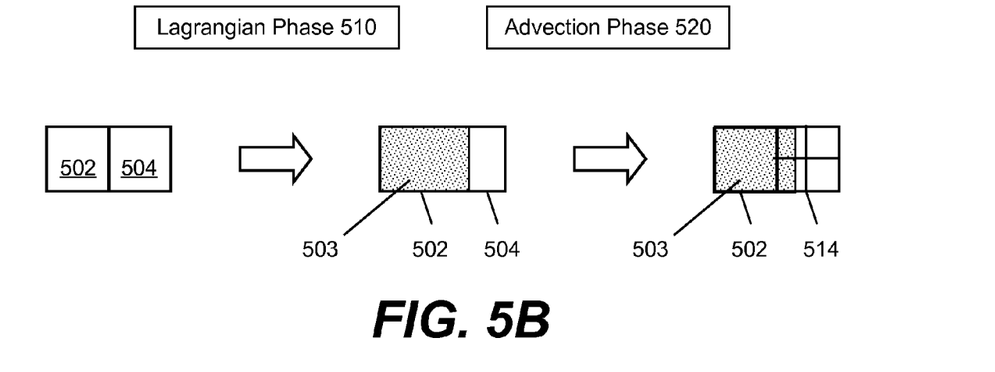

In the second example shown in FIG. 5B, the receptor 504 has been refined to eight elements 514 (only four shown due to two-dimensional view). Only four child elements (only two shown) next to the donor need to calculate respective portions of material flux 503 as illustrated in the right side diagram.

Figure 5C:
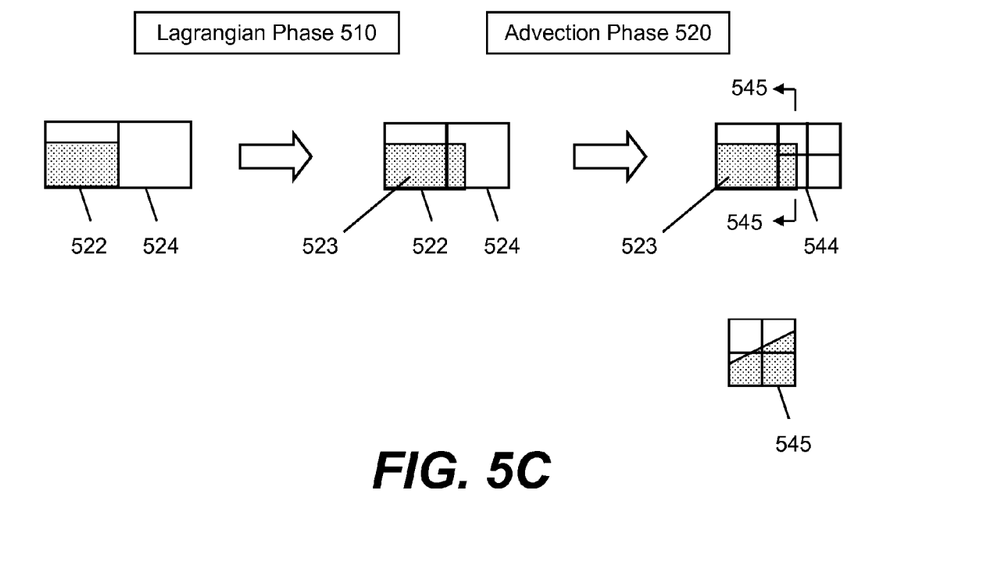

FIG. 5C shows a third example, in which element 522 contains a material partially (or contains two materials). After Lagrangian and advection phases 510-520, the material flux 523 in the refined elements 544 is complex as shown in cross-section 545 of two receptors adjacent to the donor element.

Figure 6A:
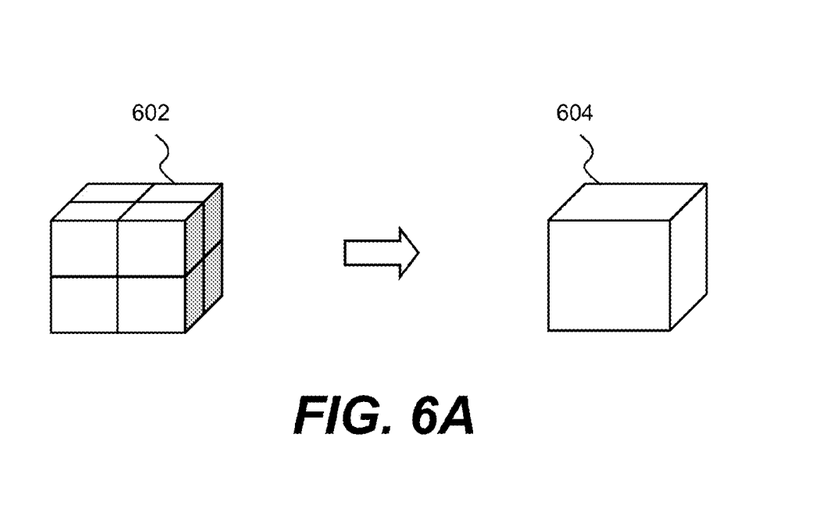
FIGS. 6A-6C are schematic diagrams showing an exemplary recombination of previously refined child elements, according to an embodiment of the present invention.
Figure 6B:
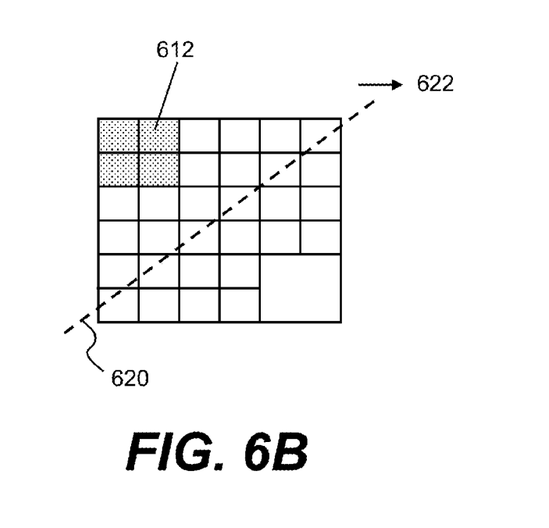
Figure 6C:
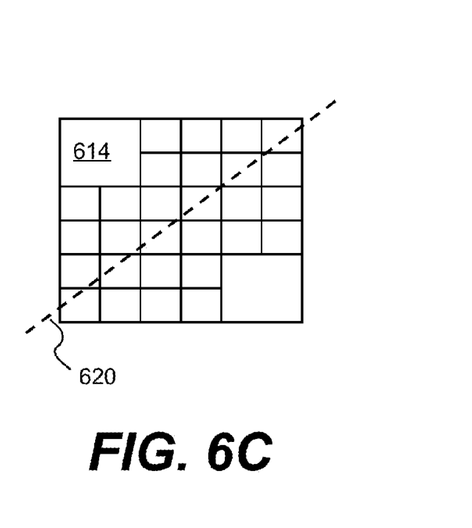

Referring back to step 116, process 100 optionally recombines previously refined child elements that are no long required, for example, structure border has emerged and passed. As shown in FIG. 6A, eight child elements 602 are recombined into one ALE element 604. In FIG. 6B, a solid border 620 travels in a direction indicated by an arrow 622. Elements 612 (shown in shaded area) are no longer required finer mesh. As a result of recombination, only one element 614 is shown in FIG. 6C.

Finally, process 100 moves to decision 118, it is determined whether the time-marching simulation has end (e.g., a user specified termination time). If "no", process 100 moves back to step 106 to repeat the above steps until decision 118 becomes true. Process 100 ends thereafter. It is noted that refinement in step 106 is performed only once if a static refinement is defined.

Figure 7:
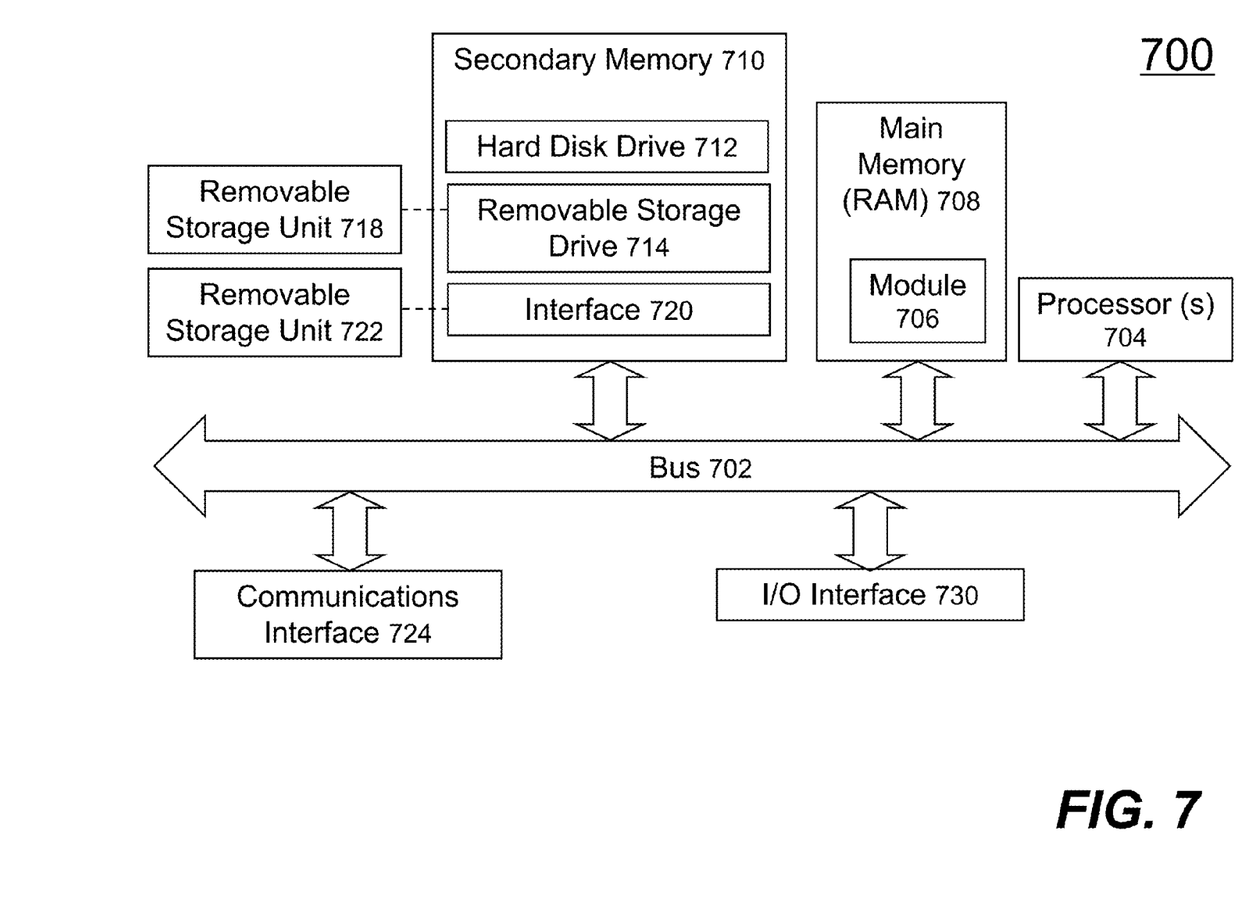
FIG. 7 is a function diagram showing salient components of an exemplary computer, in which one embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium" and "computer usable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the finite element analysis is reported to the user via the I/O interface 730 either in a text or in a graphical representation.

In one embodiment, an application module 706 is configured to facilitate the creation of a finite element analysis model representing a product. The application module 706 further allows a combined technique of subcycling and mass scaling to be used in conjunction with explicit finite element analysis. In another embodiment, the application module 706 is configured to facilitate mass scaling to certain deformed finite elements for maintaining stable solution with subcycling.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas two-dimensional diagrams have been shown and described, the present invention is directed to three-dimensional hexahedral elements. Additionally, whereas generally only one material has been shown and described, the present invention does not limit to one material in the model. Furthermore, the material flux has been shown for flowing out of one ALE element and into another for illustration simplicity. Any ALE element can receive and give material flux at the same time. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of refining Arbitrary Lagrangian-Eulerian (ALE) elements of a finite element analysis (FEA) model used in a time-marching simulation that simulates physical phenomena of a physical domain, said method comprising:
   receiving a FEA model representing a physical domain with a plurality of ALE elements in a computer system having an ALE based FEA application module installed thereon, wherein each of the ALE elements is an eight-node solid finite element having six element faces; and
   obtaining simulated physical phenomena of the physical domain by conducting a time-marching simulation using the FEA model subject to a user specified condition, said conducting the time-marching simulation comprising:
   upon detecting a user defined triggering condition, refining certain ones of the ALE elements by dividing each of said certain ones of the ALE elements into a plurality of child elements, determining and creating a list of neighbor elements of said each of the ALE elements, and determining which element face of said each of the ALE elements is next to a neighbor element without refinement;
   in a first solution phase at each time step, obtaining simulated responses in form of deformed nodal positions of said each of the ALE elements by performing a FEA of the FEA model; and
   in a second solution phase at said each time step, mapping simulated responses to another FEA mesh which includes calculating at least one material flux at each element face of said each of the ALE elements based on said deformed nodal positions and nodal positions of said another FEA mesh, determining a donor and at least one corresponding receptor at said each element face, said at least one material flux flowing out said donor and into said at least one corresponding receptor, calculating respective portions of said at least one material flux to be received in said at least one corresponding receptor when said each element face is located between an unrefined element and a refined element, otherwise the respective portions are calculated in said donor, and distributing said respective portions from said donor to said at least one corresponding receptor.

2. The method of claim 1, wherein the user specified condition comprises an initial condition.

3. The method of claim 1, wherein the user specified condition comprises a boundary condition.

4. The method of claim 1, wherein the user defined triggering condition comprises one refinement being performed at onset of the time-marching simulation.

5. The method of claim 1, wherein the user defined triggering condition comprises multiple refinements being performed periodically.

6. The method of claim 1, wherein the user defined triggering condition comprises multiple refinements being performed when one or more specific criteria have met.

7. The method of claim 6, wherein said one or more specific criteria include detecting a pressure change greater than a predefined threshold.

8. The method of claim 6, wherein said one or more specific criteria include emerging of a structure border from previous time step.

9. The method of claim 1, further comprises calculating respective volume fractions of said each of the child elements when said each of said certain ones of the ALE elements contains more than one materials.

10. The method of claim 1, wherein the at least one material flux comprises volume difference between said deformed nodal positions and said nodal positions of the FEM mesh to be mapped on.

11. The method of claim 10, wherein said FEA mesh to be mapped on is original FEA mesh of the FEA model.

12. The method of claim 10, wherein said FEA mesh to be mapped on is a new user-defined FEA mesh model.

13. The method of claim 1, wherein said first solution phase is Lagrangian phase and said second solution phase is advection phase associated with the ALE based FEA.

14. The method of claim 1, wherein said donor is one of said at least one receptor of another donor.

15. A computer readable storage medium containing instructions, when executed in a computer system, for refining Arbitrary Lagrangian-Eulerian (ALE) elements of a finite element analysis (FEA) model used in a time-marching simulation that simulates physical phenomena of a physical domain by a method comprising:

receiving a FEA model representing a physical domain with a plurality of ALE elements in a computer system having an ALE based FEA application module installed thereon, wherein each of the ALE elements is an eight-node solid finite element having six element faces; and obtaining simulated physical phenomena of the physical domain by conducting a time-marching simulation using the FEA model subject to a user specified condition, said conducting the time-marching simulation comprising:

upon detecting a user defined triggering condition, refining certain ones of the ALE elements by dividing each of said certain ones of the ALE elements into a plurality of child elements, determining and creating a list of neighbor elements of said each of the ALE elements, and determining which element face of said each of the ALE elements is next to a neighbor element without refinement;

in a first solution phase at each time step, obtaining simulated responses in form of deformed nodal positions of said each of the ALE elements by performing a FEA of the FEA model; and in a second solution phase at said each time step, mapping simulated responses to another FEA mesh which includes calculating at least one material flux at each element face of said each of the ALE elements based on said deformed nodal positions and nodal positions of said another FEA mesh, determining a donor and at least one corresponding receptor at said each element face, said at least one material flux flowing out said donor and into said at least one corresponding receptor, calculating respective portions of said at least one material flux to be received in said at least one corresponding receptor when said each element face is located between an unrefined element and a refined element, otherwise the respective portions are calculated in said donor, and distributing said respective portions from said donor to said at least one corresponding receptor.

16. The computer readable storage medium of claim 15, wherein said FEA mesh to be mapped on is original FEA mesh of the FEA model.

17. The computer readable storage medium of claim 15, wherein said first solution phase is Lagrangian phase and said second solution phase is advection phase associated with the ALE based FEA.

18. A system of refining Arbitrary Lagrangian-Eulerian (ALE) elements of a finite element analysis (FEA) model used in a time-marching simulation that simulates physical phenomena of a physical domain, said system comprising:

a main memory for storing computer readable code for an explicit finite element analysis (FEA) application module;

at least one processor coupled to the main memory, said at least one processor executing the computer readable code in the main memory to cause the explicit FEA application module to perform operations by a method of:

receiving a FEA model representing a physical domain with a plurality of ALE elements, wherein each of the ALE elements is an eight-node solid finite element having six element faces; and obtaining simulated physical phenomena of the physical domain by conducting a time-marching simulation using the FEA model subject to a user specified condition, said conducting the time-marching simulation comprising:

upon detecting a user defined triggering condition, refining certain ones of the ALE elements by dividing each of said certain ones of the ALE elements into a plurality of child elements, determining and creating a list of neighbor elements of said each of the ALE elements, and determining which element face of said each of the ALE elements is next to a neighbor element without refinement;

in a first solution phase at each time step, obtaining simulated responses in form of deformed nodal positions of said each of the ALE elements by performing a FEA of the FEA model; and in a second solution phase at said each time step, mapping simulated responses to another FEA mesh which includes calculating at least one material flux at each element face of said each of the ALE elements based on said deformed nodal positions and nodal positions of said another FEA mesh, determining a donor and at least one corresponding receptor at said each element face, said at least one material flux flowing out said donor and into said at least one corresponding receptor, calculating respective portions of said at least one material flux to be received in said at least one corresponding receptor when said each element face is located between an unrefined element and a refined element, otherwise the respective portions are calculated in said donor, and distributing said respective portions from said donor to said at least one corresponding receptor.

19. The system of claim 18, wherein said FEA mesh to be mapped on is original FEA mesh of the FEA model.

20. The system of claim 18, wherein said first solution phase is Lagrangian phase and said second solution phase is advection phase associated with the ALE based FEA.

* * * * *